Sept. 13, 1938.　　　H. P. SMITH　　　2,129,746
TRACTOR CULTIVATOR
Filed May 25, 1937　　　2 Sheets-Sheet 1

Inventor
Hiram P. Smith.
By V. F. Lavaque
Att'y.

Sept. 13, 1938. H. P. SMITH 2,129,746
TRACTOR CULTIVATOR
Filed May 25, 1937 2 Sheets-Sheet 2

Inventor
Hiram P Smith
By [signature]
Att'y.

Patented Sept. 13, 1938

2,129,746

UNITED STATES PATENT OFFICE 2,129,746

TRACTOR CULTIVATOR

Hiram P. Smith, Canton, Ill., assignor to International Harvester Company, a corporation of New Jersey Application May 25, 1937, Serial No. 144,669

5 Claims. (Cl. 97—47)

This invention relates to tractor cultivators, and particularly to means for attaching cultivators of the parallel lift type to the tractor.

With the parallel lift type of cultivator, the point of attachment of same, to insure effectiveness of the parallel links in raising and lowering of the cultivator tool bar, necessarily has to be made sufficiently high on the tractor. This is effected with less difficulty in attaching the parallel lift mechanism to the front of the tractor, but, on mounting the parallel lift on the rear of a tractor of the tricycle type, hindrance is encountered due to the large diameter of the tractor wheels and other mechanism extending rearwardly of the rear axle housing; consequently, a parallel lift mechanism that is not of standard type as to length would have to be used. For best operation, the standard lift mechanism has to be attached as closely as possible to the tractor frame or axle housing, so that it may be carried thereby and be substantially a part of the tractor.

It is the principal object of this invention to make use of the usual draw-bar ordinarily provided on modern tractors as a support for parallel lift cultivator gangs.

It is another object of this invention to provide an attaching bracket that will readily convert the draw-bar into a support means for standard parallel lift cultivator gangs, and to which any number of same may be attached according to the row spacing desired.

In carrying out this invention there is provided a bracket member adapted to be attached to the underneath side of a fixedly extended tractor draw-bar, including a transversely extending bar to which the parallel lift cultivator gangs are attached by means of a hang bracket and clamp. Also carried by the bracket is a lifting means adapted for vertical rotation to lift the cultivator gangs about the transverse bar. The lifting means is actuated by regular power lift mechanism carried by the tractor.

For other objects and for a clearer understanding of the invention, reference may be had to the following detailed description taken in connection with the accompanying drawings, in which:

Figure 3 is a side elevational view similar to Figure 1 except that it shows a cultivator operated by a single power lift; and, Figure 4 is a detail view, showing particularly the attaching bracket of the present invention.

Figure 1:
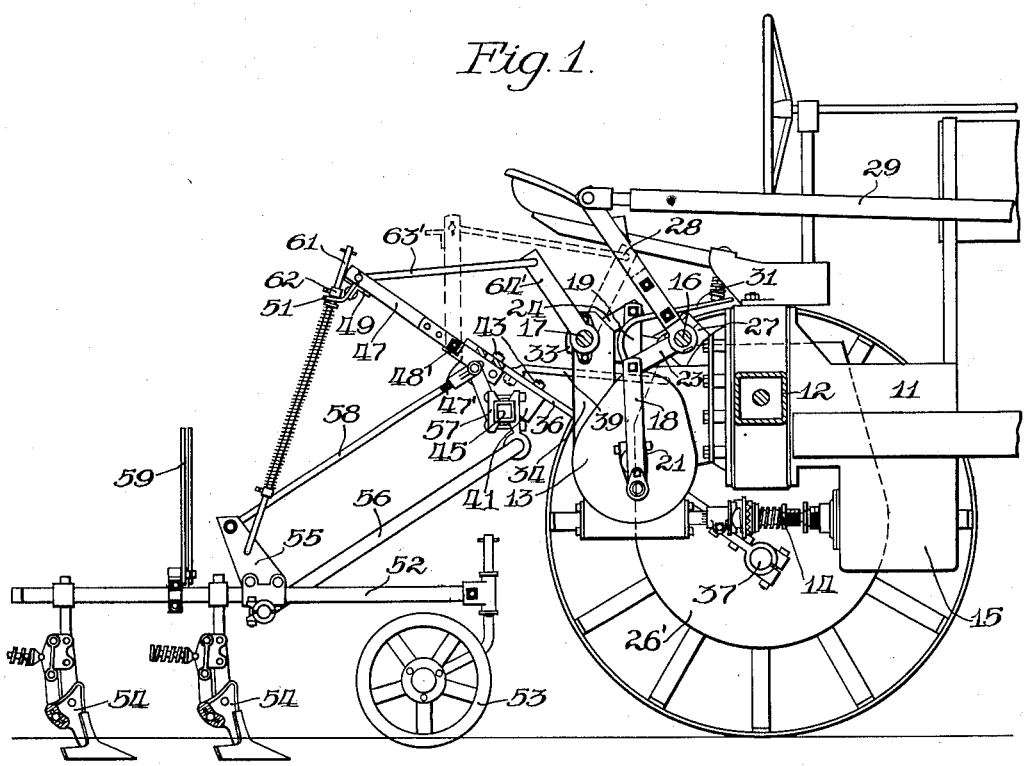
Figure 1 is a side elevational view of a portion of a tractor having a double power lift, showing a rear wheel removed, and showing cultivator gangs and the attaching bracket of the present invention connected thereto.
Figure 2:
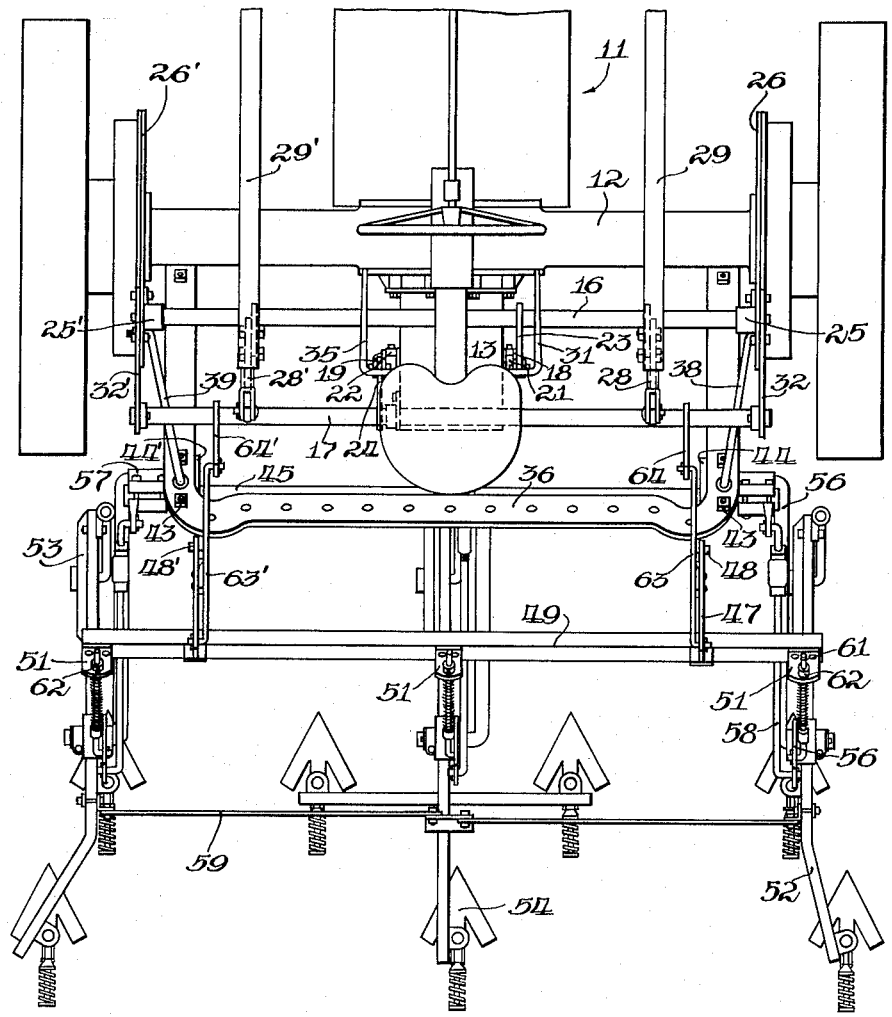
Figure 2 is a plan view of the structure shown in Figure 1, showing particularly the U-shaped draw-bar with the cultivator implements attached thereto.

In general, there is shown a tractor 11 having a rear axle housing 12 carrying a power lift mechanism 13 operatively driven through drive means 14 on the rear of a tractor transmission 15. As shown in Figure 1, the power lift mechanism is adapted to operate two transversely extending rock-shafts 16 and 17 by means of pitman members 18 and 19 actuated by power lift cranks 21 and 22 protruding from two sides of the power lift device 13.

The rock-shaft 16 has an extending arm 23 for connection with the pitman 18, and the rock-shaft 17 has an extending arm 24 for connection with the pitman 19. The rock-shaft 16 is a regular part of the equipment of a tractor having a power lift device and is supported at its ends in bearings 25 and 25' in tractor axle housing side plates 26 and 26'. It is supported centrally on the rear axle housing by an intermediately spaced bearing 27. This rock-shaft 16 has upwardly extending arms 28 and 28' for respective actuation of longitudinally extending lift pipes 29 and 29' for actuating cultivator gangs on the forward end of the tractor, not shown. These front cultivating gangs are preferably of the parallel lift type, such as shown in assignee's Patent 1,960,270 to Lindgren et al., issued May 29, 1934. By actuation of the operating hand lever 31 on the power lift device shown in Figure 1, the front gang assembly may be lifted independently of any movement of the rear gang assembly.

The transverse rock-shaft 17 is auxiliary equipment adapted for ready attachment by means of rock-shaft brackets 32 and 32' to the side plates 26 and 26', respectively. The shaft is centrally supported by means of a center rock-shaft, two-part bearing 33 carried in an upright support 34 attached to the power lift housing 13. This rock-shaft is actuated in response to an operating hand lever 35 on the opposite side of the power lift mechanism from the hand lever 31.

The tractor 11 carries a U-shaped draw-bar 36 pivotally connected to the rear axle housing, as indicated at 37, on each side of the tractor. In order to make use of this tractor draw-bar in the present invention, the draw-bar is held in a position inclined to the longitudinal axis of the tractor and raised to a substantial height above the ground at a point sufficient for conveniently mounting the cultivator implements thereunder. It is held fixed in this position by means of tie members 38 and 39 connected to the tractor.

Mounted on the underneath side of this tractor draw-bar 36 is the transverse implement supporting bracket 41 of the present invention adapted to be attached to or detached from the draw-bar by means of bolts 42 and nuts 43. This bracket is shown in detail in Figure 4, and it comprises generally two angle-shaped attaching pieces 44 and 44' and a transverse pipe bar 45 welded, as indicated at 46, to each of the attaching pieces 44 and 44'. This pipe bar 45 is preferably tubular and of square-cross section. The pipe 45 is so secured to the attaching pieces, which, when mounted on the under-side of the draw-bar, are at an angle with the longitudinal axis of the tractor,—that an under face 45' is parallel with the ground and with the longitudinal axis of the tractor. The bracket 41 also carries a pivoted lifting bail means 47 having its ends pivoted to the upper ends of the attaching pieces 44, 44', as indicated at 48 and 48'. This bail consists of two pieces 47 and 47' and a transversely extending bar of angular cross-section 49, to which is fixed a plurality of lifting lip projections 51. It should be seen that, when the attaching pieces 44 are attached to or detached from the draw-bar 36, the transverse pipe bar 45 and the lifting bail means 47—49 are removed therewith.

The cultivator equipment is of the standard parallel lift type, consisting generally of a tool bar 52 having a gauge wheel 53 and spring tripped cultivator working implements 54 attached thereto. The tool bar also has a gang beam attaching bracket 55, to which is pivotally connected the trailing end of a gang beam 56 pivotally attached at its upper end to a gang beam hang bracket and clamp 57 carried on the transverse pipe bar 45. Also, connecting the tool bar bracket 55 with the hang bracket 57, there is a parallel link 58, which effects parallel lift of the cultivator implements and tool bar upon being raised out of the ground. It should be understood that any number of hang brackets 57 may be mounted on the transverse bar 45 of the bracket 44 of the present invention, depending upon the row spacing desired. The trailing ends of the tool bars may be held transversely by arched tie members 59 attached between adjacent tool bars.

In order to effect lifting of the rear cultivator gangs, which, as shown in Figure 1, may be done independently of the lifting of the front gangs, there are provided lifting rods 61 attached to the tool brackets 55 at their lower ends and passing through the bail projections 51, which bear against fixed collar members 62 for effecting a lift of the rods. By means of links 63 and 63' connected to arms 64 and 64' on the auxiliary rock-shaft 17, the lifting bail 47 may be made to rotate, about its connection 48 with the bracket pieces 44, to the position indicated by the dotted lines in Figure 1. It will, therefore, be seen that this will effect a lift of the cultivator gangs on a detachable bracket adapted to be carried by the draw-bar of the tractor.

In Figure 3 there is shown the same bracket of the present invention attached to the same lifting mechanism that is used for lifting of the front gangs. For tractors having only a single power lift mechanism, the bracket for the present invention may still be used, but the lift is effected by the front gang operating means through a link 65 connected to the arm 28 of the forward rock-shaft 16, the front and rear gangs being operated at the same time and not independently.

It will, therefore, be seen that the present invention has ready adaptability to tractors having but a single power lift as well as to tractors having the double power lift.

From the foregoing description, it should now be seen that means has been provided for attaching parallel lift cultivator gangs to a tractor and that said means may be readily adapted to tractor draw-bars which are the regular equipment of a modern tractor, with the result that an ordinary tractor may now be readily converted into a tractor cultivator with cultivator gangs of the parallel lift type, such as ordinarily used on the front of a tractor, directly connected on the rear of the tractor.

It is to be understood that the detailed structure of the present invention may have various modifications, but such modifications shall be without departure from the spirit and scope of the invention as defined by the following claims.

What is claimed as new is:

1. In a tractor implement, a draw-bar carried by the tractor, means for fixing the draw-bar inclined to the longitudinal axis of the tractor to allow sufficient height for mounting an implement thereunder, a separable bracket adapted to be attached to the underneath side of the draw-bar, and implements of the parallel lift type mounted for operation on said bracket.

2. In a tractor cultivator, a draw-bar carried by the tractor, means for fixing the draw-bar inclined to the longitudinal axis of the tractor to allow sufficient height for mounting the cultivator thereunder, a separable bracket adapted to be attached to the underneath side of the draw-bar including a transverse cultivator supporting bar, and cultivator gangs of the parallel lift type mounted for operation on said transverse bar.

3. In a tractor cultivator, a draw-bar carried by the tractor, means for fixing the draw-bar inclined to the longitudinal axis of the tractor to allow sufficient height for mounting the cultivator thereunder, a separable bracket adapted to be attached to the underneath side of the draw-bar comprising attaching pieces and a transverse gang cultivator supporting bar of substantially square shape cross-section, said bar being so fixed to the attaching pieces that one of the faces is parallel to the tractor axis, and cultivator gangs of the parallel lift type mounted for operation on the transverse bar.

4. In a tractor implement, a power lift on the tractor, a draw-bar carried by the tractor, means for fixing the draw-bar inclined to the longitudinal axis of the tractor to allow sufficient height for mounting an implement thereunder, a separable bracket means adapted to be attached to the underneath side of the draw-bar and including lifting means adapted to be connected with the power lift, and an implement of the parallel lift type mounted for operation on the bracket by the lifting means and power lift.

5. In a tractor cultivator, a power lift on the tractor, a draw-bar carried by the tractor, means for fixing the draw-bar inclined to the longitudinal axis of the tractor to allow sufficient height for the mounting of cultivating gangs thereunder, a separable bracket assembly adapted to be attached to the underneath side of the draw-bar including a transverse bar to which a plurality of cultivating gangs of the parallel lift type may be attached for operation, and a lifting bail connected to the cultivator gangs and adapted for attachment to the power lift.

HIRAM P. SMITH.